United States Patent [19]
Kim et al.

[11] Patent Number: 6,091,466
[45] Date of Patent: Jul. 18, 2000

[54] LIQUID CRYSTAL DISPLAY WITH DUMMY DRAIN ELECTRODE AND METHOD OF MANUFACTURING SAME

[75] Inventors: Woong Kwon Kim; Eun Pyo Hong, both of Kyunggi-do, Rep. of Korea

[73] Assignee: LG Electronics Inc., Seoul, Rep. of Korea

[21] Appl. No.: 09/037,700

[22] Filed: Mar. 10, 1998

[30] Foreign Application Priority Data

Sep. 5, 1997 [KR] Rep. of Korea ....................... 97-46014

[51] Int. Cl.[7] .......................... G02F 1/136; G02F 1/1343; H01L 29/04
[52] U.S. Cl. .................................. 349/43; 349/38; 257/59
[58] Field of Search ............................ 349/38, 43; 257/59

[56] References Cited

U.S. PATENT DOCUMENTS

| | | | |
|---|---|---|---|
| 5,600,461 | 2/1997 | Ueda et al. .............................. | 349/38 |
| 5,880,794 | 3/1999 | Hwang ..................................... | 349/38 |
| 5,926,235 | 7/1999 | Han et al. ................................. | 349/43 |
| 5,949,507 | 9/1999 | Shimada et al. ......................... | 349/43 |
| 5,955,744 | 9/1999 | Gu et al. .................................. | 349/38 |

*Primary Examiner*—William L. Sikes
*Assistant Examiner*—Heidi L. Eisenhut
*Attorney, Agent, or Firm*—Morgan, Lewis & Bockius LLP

[57] ABSTRACT

A liquid crystal display device includes a substrate, a gate electrode and a dummy electrode formed on the substrate, a gate insulation layer formed over the gate electrode, a transistor semiconductor layer formed over the gate insulation layer, a source electrode and a drain electrode formed over the gate insulation layer and over the transistor semiconductor layer, wherein the drain electrode is in contact with the dummy electrode, a passivation layer formed over the substrate, the source electrode, and the drain electrode, and a pixel electrode formed over the passivation layer and in contact with the dummy electrode.

29 Claims, 8 Drawing Sheets

LIQUID CRYSTAL DISPLAY WITH DUMMY DRAIN ELECTRODE AND METHOD OF MANUFACTURING SAME

This application claims the benefit of Korean patent application No. 97-46014, filed Sep. 5, 1997, which is hereby incorporated by reference.

BACKGROUND OF THE INVENTION

1. Field of the Invention

The present invention relates to a liquid crystal display device including an active panel, and more particularly, to a method of manufacturing a liquid crystal display device with low contact resistance between a drain electrode of the thin film transistor and the pixel electrode, and a method of manufacturing same.

2. Discussion of the Related Art

Thin film type flat panel display devices are often used in portable applications due to their light weight and easy adaptability. Research has focused on liquid crystal display devices (LCDs) because their high resolution and fast response time make them suitable for display of motion picture images.

A liquid crystal display device works by using polarized light and an optical anisotropy of a liquid crystal. By controlling orientation of rod-shaped liquid crystal molecules, transmission and interception of light through the liquid crystal are achieved due to the optical anisotropy of the liquid crystal. This principle is applied to the liquid crystal display device. Active Matrix Liquid Crystal Displays (AMLCDs) having thin film transistors (TFTs) arranged in a matrix pattern and pixel electrodes connected to the TFTs provide high quality images, and are now widely used. A structure of a conventional AMLCD will now be described.

Generally, a liquid crystal display device includes two panels facing each other with a liquid crystal material in between. The first panel (a color filter panel) of an LCD includes a sequential arrangement of red, blue and green color filters on a transparent substrate at pixel positions arranged in a matrix pattern. Among these color filters, black matrices are formed in a lattice pattern. A common electrode is formed on the color filters.

The second panel (an active panel) of the LCD includes pixel electrodes arranged in a matrix pattern and formed on a transparent substrate. Scan bus lines are arrayed along a column direction of the pixel electrodes, and data bus lines are arrayed along a row direction of the pixel electrodes. At a corner of each pixel, a TFT for driving the pixel electrode is formed. A gate electrode of the TFT is connected to the scan bus line (often referred to as a gate line). A source electrode of the TFT is connected to the data bus line (often referred to as a source line). A gate pad is formed at an end portion of each gate line, and a source pad is formed at an end portion of each source line.

The color filter panel and the active panel are bonded together facing each other with a certain distance between them (i.e., a cell gap). Liquid crystal material fills the cell gap, thus completing the liquid crystal panel of the LCD.

The method of manufacturing a simple liquid crystal display involves a combination of several processes. Manufacturing an active panel having TFTs and pixel electrodes involves additional steps. If the active panel has a shorting bar for probing the active panel, the manufacturing method is more complicated still. Therefore, it is important to simplify the manufacturing method of an active panel to reduce the possibility of defects during the manufacture process.

A conventional method for manufacturing an active panel having a shorting bar will be described with reference to FIG. 1, which shows a plan view of an active panel and FIGS. 2A–2F, which show cross-sectional views taken along line II—II of FIG. 1.

Aluminum or an aluminum alloy is deposited on a substrate 1, such as a transparent non-alkalic glass substrate, to form a thin aluminum layer. A low resistance gate line 13a is formed by patterning the thin aluminum layer using a first mask process. The low resistance gate line 13a extends along a row direction of a pixel array, which is arranged in a matrix, as shown in FIGS. 1 and 2A.

Figure 1:
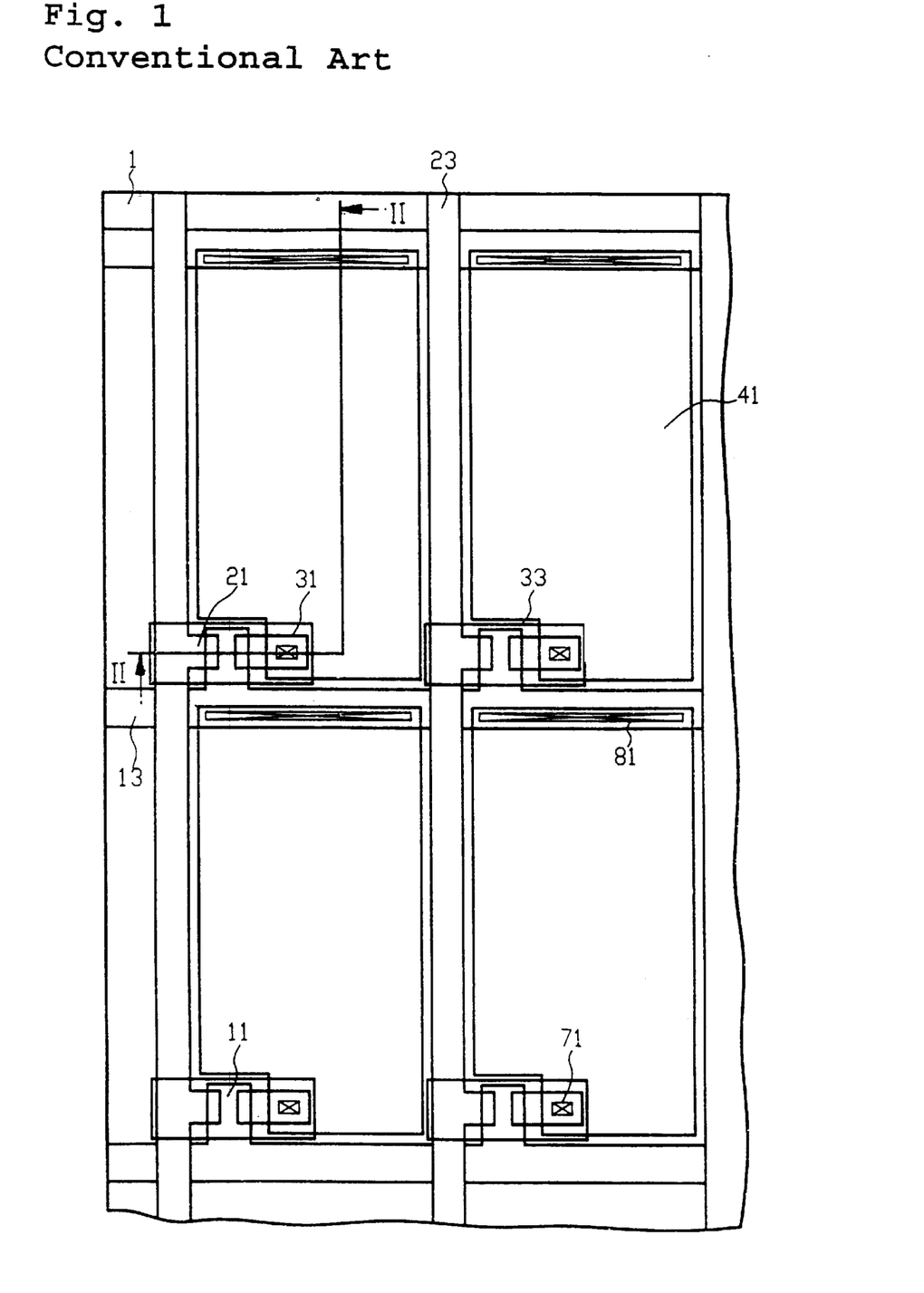
FIG. 1 is a plan view showing a conventional structure of a liquid crystal display device.
Figure 2A:
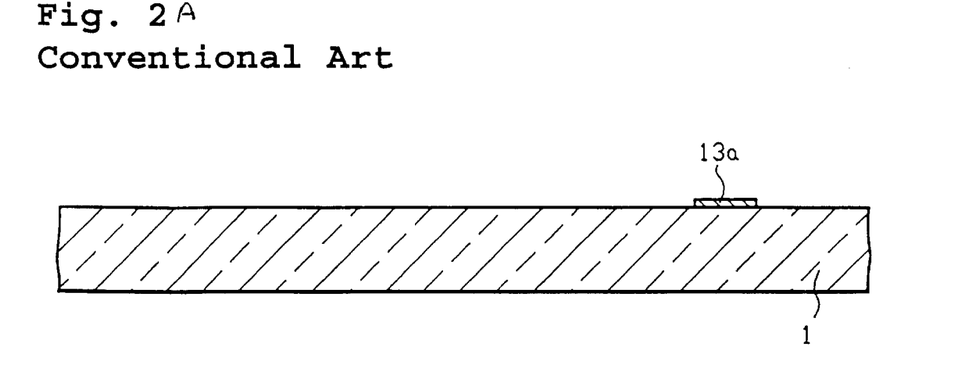
FIGS. 2A–2F are cross-sectional views along line II—II of FIG. 1 showing a conventional method for manufacturing an LCD.
Figure 2B:
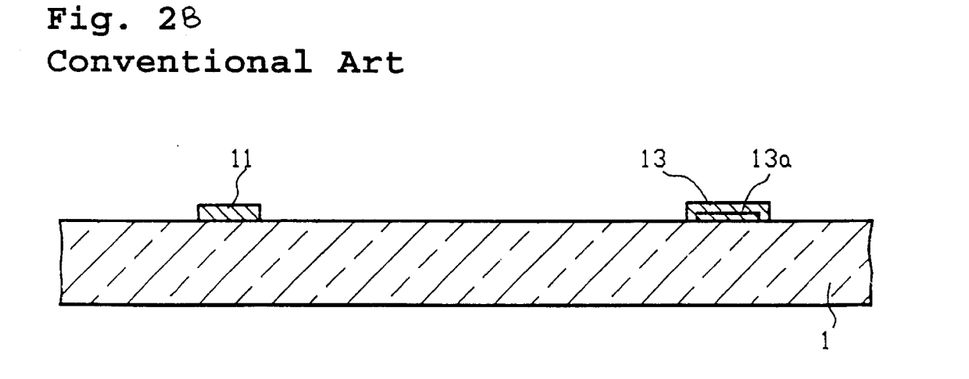

A metal layer, including one of chromium, molybdenum, tantalum, or antimony, is deposited on the substrate 1 and the low resistance gate layer 13a (not shown in FIGS. 1 and 2A). A gate electrode 11 and a gate line 13 are formed by patterning the metal layer using a second mask process. The gate line 13 covers the low resistance gate line 13a. The gate electrode 11 is derived from the gate line 13 and is formed at one corner of the pixel, as shown in FIG. 2B.

Figure 2C:
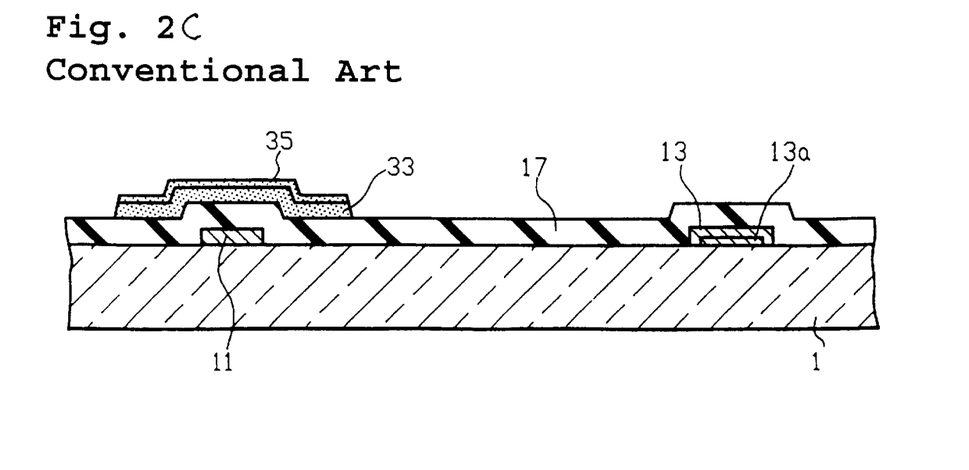

As shown in FIG. 2C, first inorganic material, such as silicon nitride or silicon oxide, is deposited on the substrate 1 and the gate line 13 to form a gate insulation layer 17. An intrinsic semiconductor material, such as pure amorphous silicon, and an extrinsic semiconductor material, such as impurity doped amorphous silicon, are sequentially deposited thereon. A semiconductor layer 33 and a doped semiconductor layer 35 are formed by patterning the intrinsic and extrinsic semiconductor materials by using a third mask process.

Figure 2D:
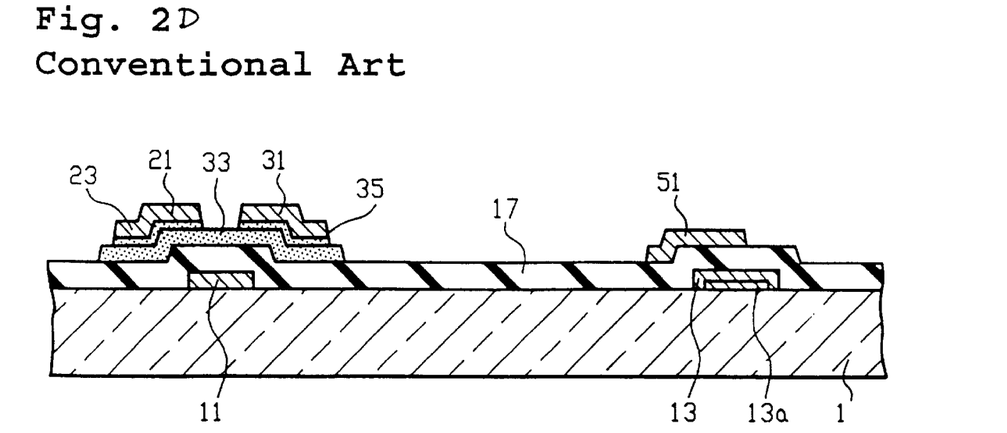

FIG. 2D illustrates that a chromium layer is deposited on the substrate and the doped semiconductor layer 35. A source electrode 21, a drain electrode 31, a storage capacitor electrode 51 and a source line 23 are formed by patterning the chromium layer using a fourth mask process. The source electrode 21 overlaps one side of the gate electrode 11, with the semiconductor layer 33 and the doped semiconductor 35 sandwiched in between. The drain electrode 31 faces the source electrode 21 and overlaps another side of the gate electrode 11. The source line 23 connects to the source electrode 21, a plurality of which will be arrayed in a column direction. The doped semiconductor layer 35 is separated into two parts using the source electrode 21 and the drain electrode 31 as a mask. The doped semiconductor layer 35 is an ohmic contact to the source electrode 21 and the drain electrode 31. The storage capacitor electrode 51 overlaps a portion of the gate line 13, with the gate insulation layer 17 below the storage capacitor electrode 21. The storage capacitor electrode 51 and the overlapped portion of the gate line 13 form a storage capacitor to compensate for leakage of charge stored in the liquid crystal capacitor, as shown in FIG. 2D.

Figure 2E:
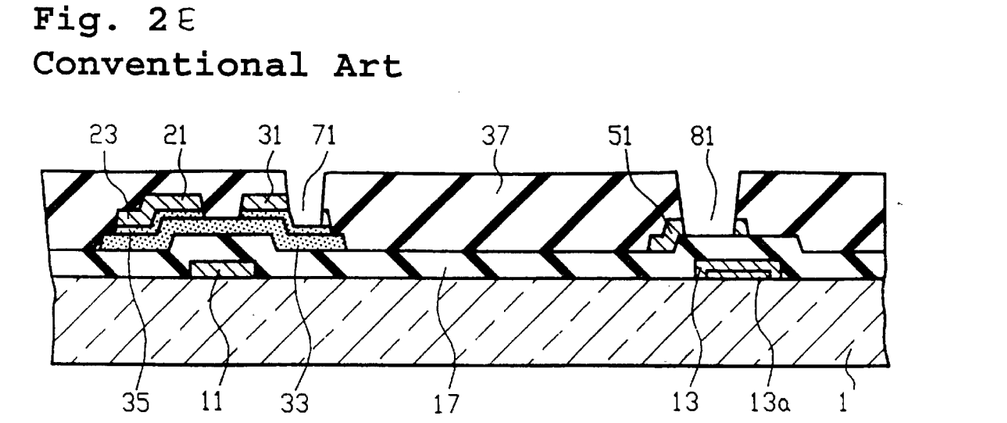

A passivation layer 37 is formed by coating an organic insulation material such as BCB (Benzo-Cyclo-Butene) over the entire structure. A drain contact hole 71 and a storage capacitor contact hole 81 are formed by patterning the passivation layer 37 using a fifth mask process. The drain contact hole 71 exposes a portion of a surface of the drain electrode 31, and the storage capacitor contact hole 81 exposes a portion of a surface of the storage capacitor electrode 51, as shown in FIG. 2E.

Figure 2F:
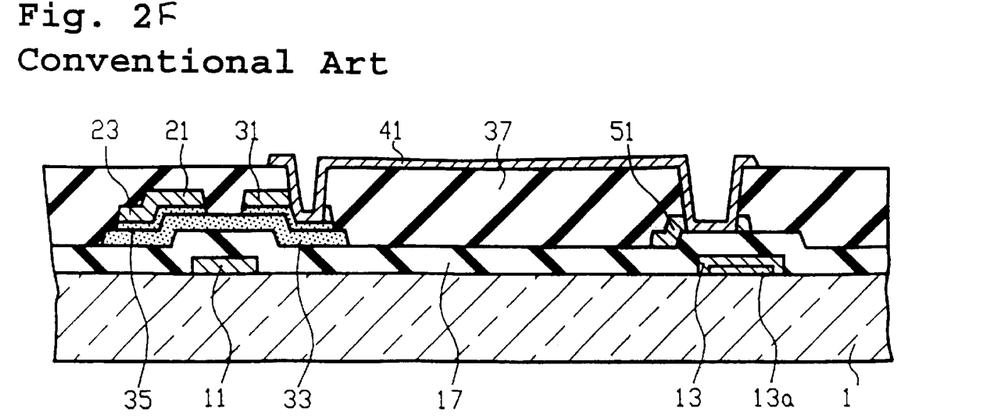

An ITO (Indium Tin Oxide) layer is deposited on the passivation layer 37 and patterned to form a pixel electrode 41 by using a sixth mask process. The pixel electrode 41 connects to the drain electrode 31 through the drain contact hole 71 and connects to the storage capacitor electrode 51 through the storage capacitor contact hole 81, as shown in FIG. 2F. Therefore, charge stored in the storage capacitor formed by overlapping the storage capacitor electrode 51 and the portion of the gate line 13 leaks out over time.

Figure 3A:
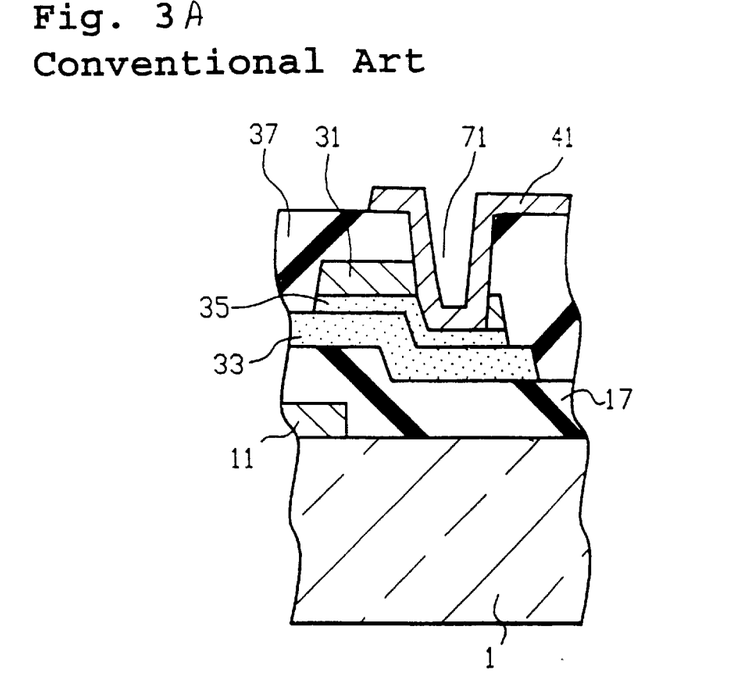
FIG. 3A is a cross-sectional view showing a structure of a contact between a drain electrode and a pixel electrode in the conventional LCD.

In the conventional LCD, the passivation layer 37 comprises an organic material such as BCB in order to get a high aperture ratio. Generally, an etchant including a fluorine ion ($F^-$) is used for etching the organic material to form the drain contact hole 71 and the storage capacitor contact hole 81. Exposed portions of the drain electrode 31 and the storage capacitor electrode 51 can be etched by the etchant having the fluorine ion ($F^-$). Therefore, etched sides of the drain electrode 31 and the storage capacitor electrode 51, rather than their surfaces, are exposed through the contact holes 71 and 81. After that, ITO is deposited thereon to form the pixel electrode 41. The etched sides of the drain electrode 31 and the storage capacitor electrode 51 are in contact with the pixel electrode 41, as shown in FIGS. 3A and 3B.

Figure 3B:
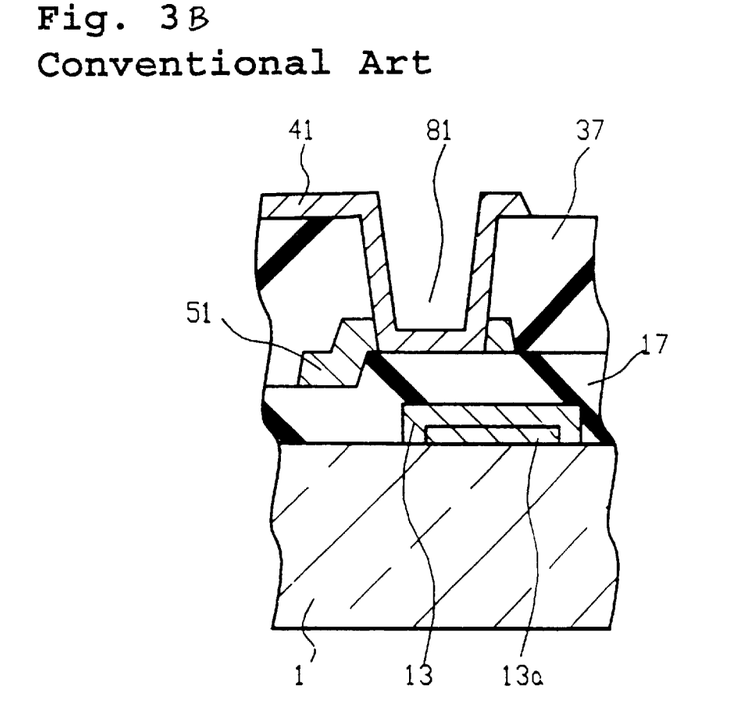
FIG. 3B is a cross-sectional view showing a structure of a contact between a storage capacitor electrode and the pixel electrode in the conventional LCD.

The storage contact hole 81 is large enough to maintain normal contact, as shown in FIG. 3B, and contact resistance remains low. However, the drain contact hole 71 is very small, as shown in FIG. 3A. When the etched side of the drain electrode 31 is in contact with the pixel electrode 41, contact resistance is high because the contact area is too small. Therefore, electrical signal voltage representing an image may not be properly applied to the pixel electrode 41, resulting in an uneven quality of the image.

Characteristics of the TFT of an LCD representing a horizontal dark stripe on the screen were measured. The LCD had a 12.1 inch display area and included a BCB material as a passivation layer. The result showed that there is a problem in the current output curve between the source electrode 21 and the pixel electrode 41 of the TFT corresponding to the horizontal dark line. A calculation of the resistance of the drain electrode 31 shows that the resistance should be less than 1.5MΩ in order to avoid the horizontal dark stripe. If the resistance is larger than 3MΩ, a horizontal dark stripe will appear. Thus, one reason for the unevenness of the displayed image is high resistance of the drain electrode 31 resulting from the high contact resistance between the drain and pixel electrodes 31 and 41.

SUMMARY OF THE INVENTION

Accordingly, the present invention is directed to a liquid crystal display and method of manufacturing the same that substantially obviates one or more of the problems due to limitations and disadvantages of the related art.

One object of the present invention is to enlarge the contact area between the drain and the pixel electrodes in an LCD having an organic material as a passivation layer.

Another object of the present invention is to reduce contact resistance between the drain electrode and the pixel electrode by enlarging the contact area between them.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with one aspect of the present invention there is provided a method for manufacturing a liquid crystal display device, including the steps of forming a dummy drain electrode on a substrate, depositing an insulation material on the dummy drain electrode, forming a gate insulation layer by patterning the insulation material to expose the dummy drain electrode, and forming a drain electrode in contact with the dummy drain electrode.

In another aspect of the present invention, there is provided a liquid crystal display device, including a substrate, a dummy drain electrode on the substrate, a drain electrode covering the dummy drain electrode, a passivation layer covering the drain electrode, a drain contact hole exposing the drain electrode and the dummy drain electrode, and a pixel electrode in contact with the drain electrode and the dummy drain electrode through the drain contact hole.

In another aspect of the present invention, there is provided a liquid crystal display device, including a substrate, a gate electrode and a dummy electrode formed on the substrate, an gate insulation layer formed over the gate electrode, a transistor semiconductor layer formed over the gate insulation layer, a source electrode and a drain electrode formed over the gate insulation layer and over the transistor semiconductor layer, wherein the drain electrode is in contact with the dummy electrode, a passivation layer formed over the substrate, the source electrode, and the drain electrode, and a pixel electrode formed over the passivation layer and in contact with the dummy electrode.

In another aspect of the present invention, there is provided a method manufacturing a liquid crystal display device, including the steps of forming a gate electrode and a dummy electrode on a substrate, forming a gate insulation layer over the gate electrode, forming a transistor semiconductor layer over the gate insulation layer, forming a source electrode and a drain electrode over the gate insulation layer and the transistor semiconductor layer, wherein the drain electrode is in contact with the dummy electrode, forming a passivation layer over the substrate, the source electrode and the drain electrode, and forming a pixel electrode over the passivation layer and in contact with the dummy electrode.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
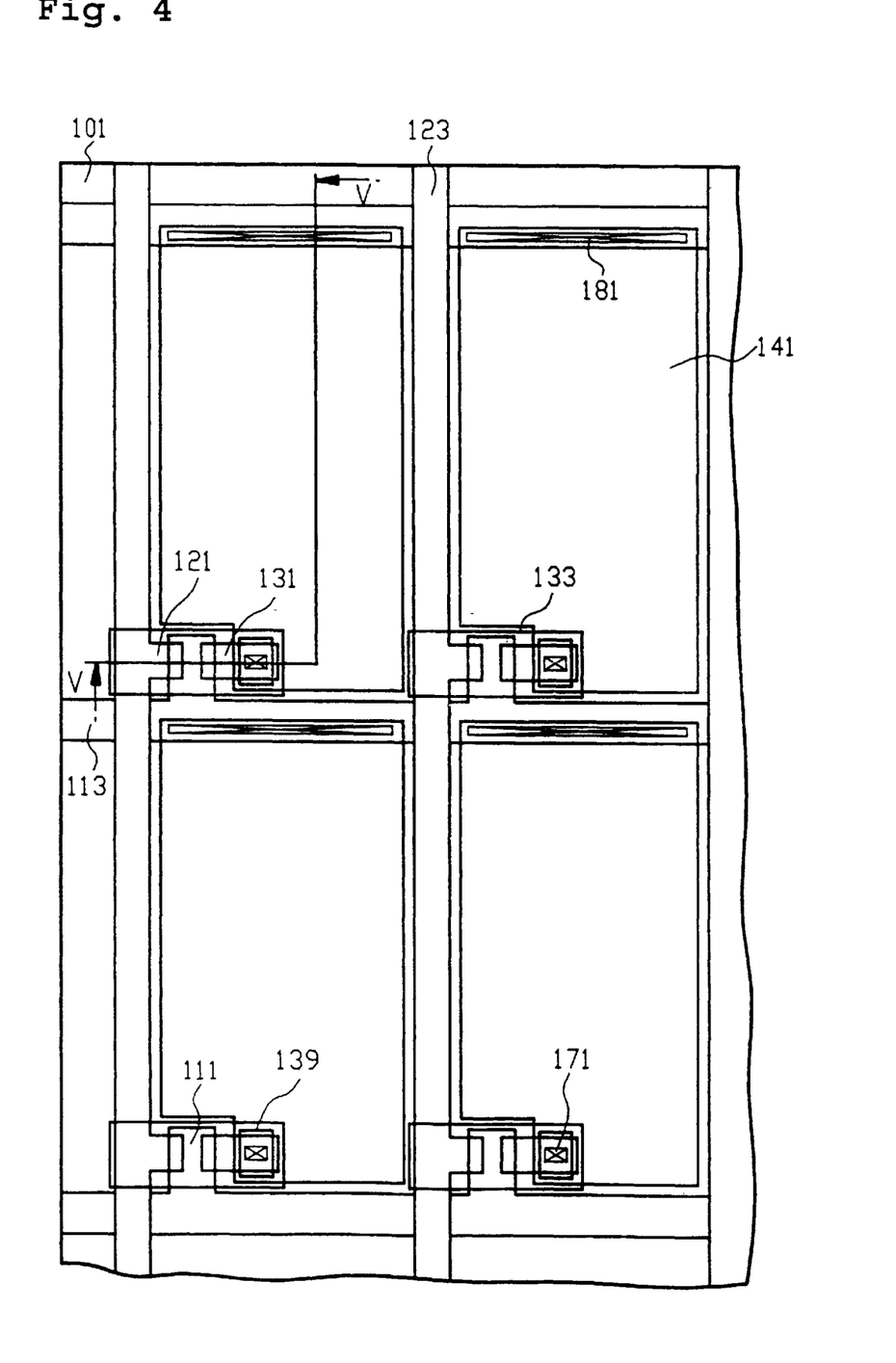
FIG. 4 is a plan view showing a structure of a liquid crystal display device according to the present invention.

A preferred embodiment of the present invention will be explained with reference to FIG. 4 showing a plan view of the present invention, and FIGS. 5A–5F showing a cross-sectional view of a manufacturing process of the present invention, taken along line V—V of FIG. 4.

Figure 5A:
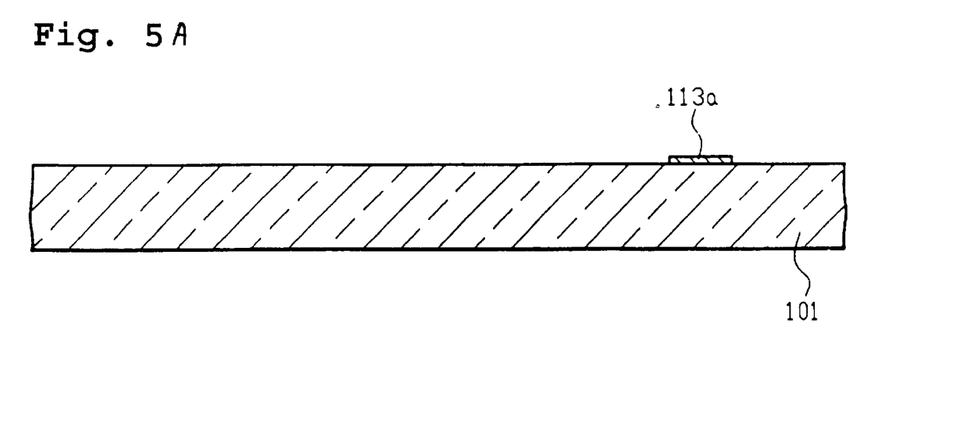
FIGS. 5A–5F are cross-sectional views along line V—V of FIG. 4 showing a method for manufacturing an LCD according to the present invention.

Aluminum or an aluminum alloy is deposited on a glass substrate 101 (which is usually formed of a transparent glass material) to form an aluminum layer. The aluminum layer is patterned to form a low resistance gate line 113a using a first mask process. The low resistance gate line 113a extends along a row direction of pixels arranged in a matrix array, as shown in FIG. 5A.

Figure 5B:
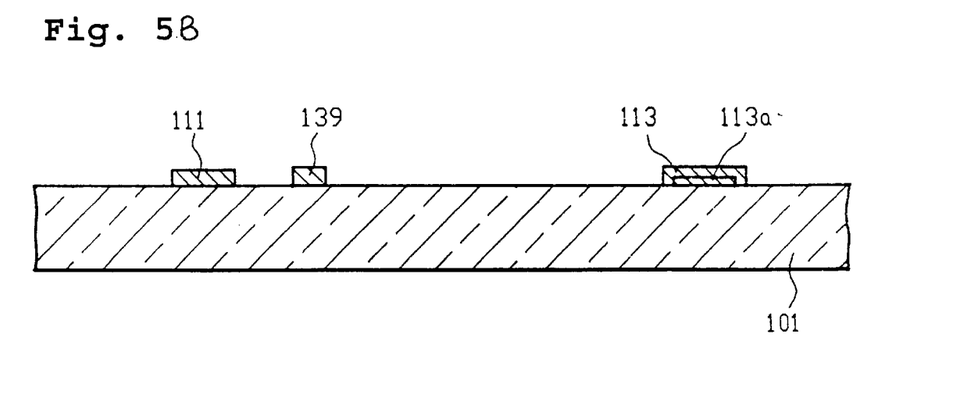

As shown in FIG. 5B, a metal layer, including one of chromium, molybdenum, tantalum, or antimony, is deposited on the substrate 101 and the low resistance gate layer 113a (not shown in the Figures). A gate electrode 111, a gate line 113, and a dummy drain electrode 139 are formed by patterning the metal layer using a second mask process. The gate line 113 covers the low resistance gate line 113a. The gate electrode 111 is derived from the gate line 113 and formed at one corner of the pixel. The dummy drain electrode 139 is formed at a position where a drain electrode will be formed later.

Figure 5C:
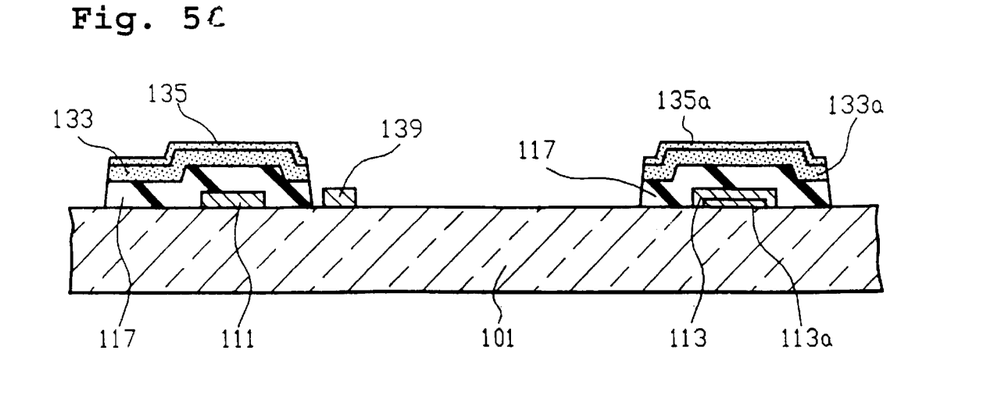

FIG. 5C illustrates that a first inorganic material, such as silicon nitride or silicon oxide, is deposited on the substrate 101 and the gate line 113 to form a gate insulation layer 117. An intrinsic semiconductor material, such as pure amorphous silicon, and an extrinsic semiconductor material, such as impurity doped amorphous silicon, are sequentially deposited thereon. A semiconductor layer 133 and a doped semiconductor layer 135 are formed by patterning the intrinsic and extrinsic semiconductor layers using a third mask process. The dummy drain electrode 139 is entirely exposed. The gate line 113 is covered by the gate insulation layer 117, a semiconductor layer 133a, and a doped semiconductor layer 135a.

Figure 5D:
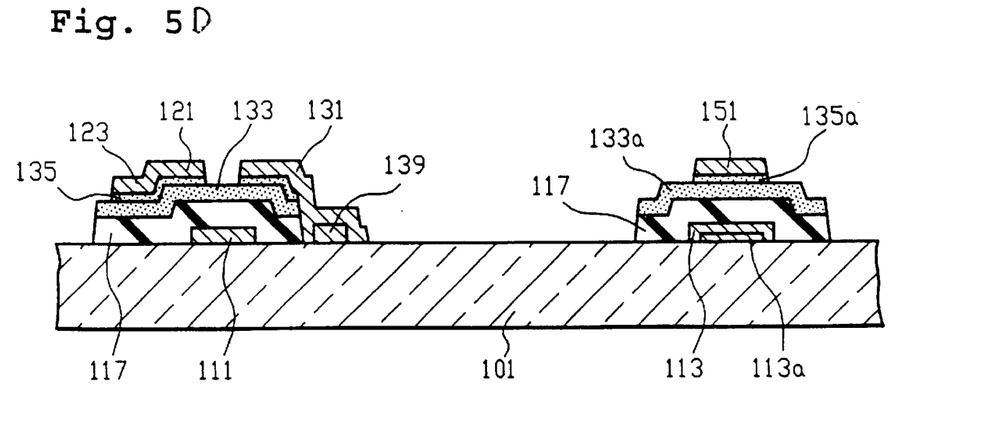

As shown in FIG. 5D, a chromium layer is deposited on the substrate 101 and the doped semiconductor layer 135. A source electrode 121, a drain electrode 131, a storage capacitor electrode 151, and a source line 123 are formed by patterning the chromium layer using a fourth mask process. The source electrode 121 overlaps a side of the gate electrode 111, with the semiconductor layer 133 and the doped semiconductor layer 135 sandwiched between the source electrode 121 and the gate electrode 111. The drain electrode 131 faces the source electrode 121, overlaps another side of the gate electrode 111, and covers the dummy drain electrode 139. The source line 123 connects to the source electrode 121, a plurality of which will be arrayed in column direction. The doped semiconductor layer 135 is separated into two parts using the source electrode 121 and the drain electrode 131 as a mask. The doped semiconductor layer 135 is an ohmic contact with the source electrode 121 and the drain electrode 131. The storage capacitor electrode 151 overlaps a portion of the gate line 113 with the gate insulation layer 117, the semiconductor layer 133a, and the doped semiconductor layer 135a sandwiched in between. The storage capacitor electrode 151 and the overlapped portion of the gate line 113 form a storage capacitor to compensate for charge leaking from a liquid crystal capacitor, as shown in FIG. 5d.

Figure 5E:
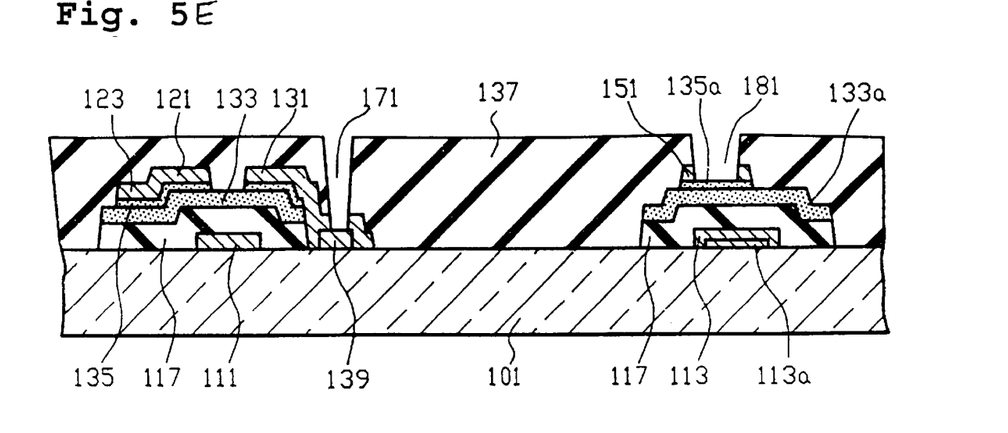

A passivation layer 137 is formed by coating an organic insulation material such as BCB (Benzo-Cyclo-Butene) on the entire structure. A drain contact hole 171 and a storage capacitor contact hole 181 are formed by patterning the passivation layer 137 using fifth mask process. The drain contact hole 171 exposes a portion of a surface of the drain electrode 131, and the storage capacitor contact hole 181 exposes a portion of a surface of the storage capacitor electrode 151. When the drain contact hole 171 is formed, the drain electrode 131 can be etched by an etchant used for etching the passivation layer 137, so that only an etched side of the drain electrode 131 can be exposed. A surface of the dummy drain electrode 139 will also be exposed, as shown in FIG. 5E.

Figure 5F:
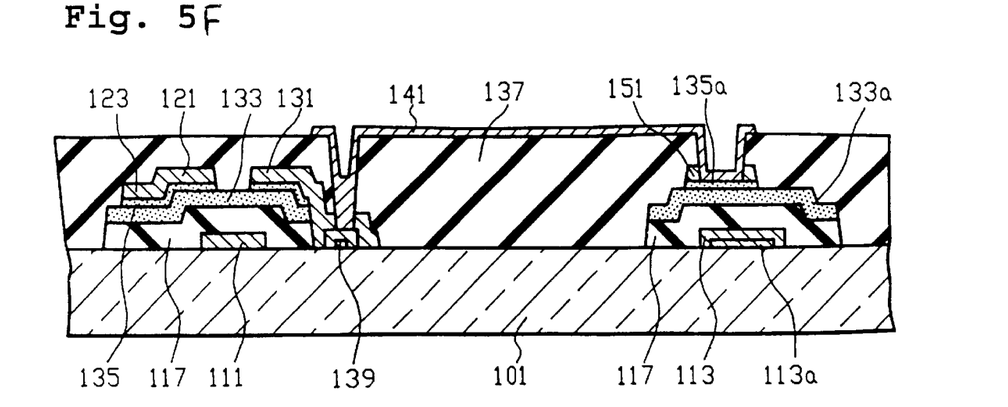

An ITO layer is deposited on the passivation layer 137, and is patterned to form a pixel electrode 141 by using a sixth mask process. The pixel electrode 141 connects to the drain electrode 131 and to the dummy drain electrode 139 through the drain contact hole 171. The pixel electrode 141 also connects to the storage capacitor electrode 151 through the storage capacitor contact hole 181, as shown in FIG. 5F. Therefore, charge stored in the storage capacitor formed by overlapping the storage capacitor electrode 151 and the portion of the gate line 113 leaks out over time.

Figure 6A:
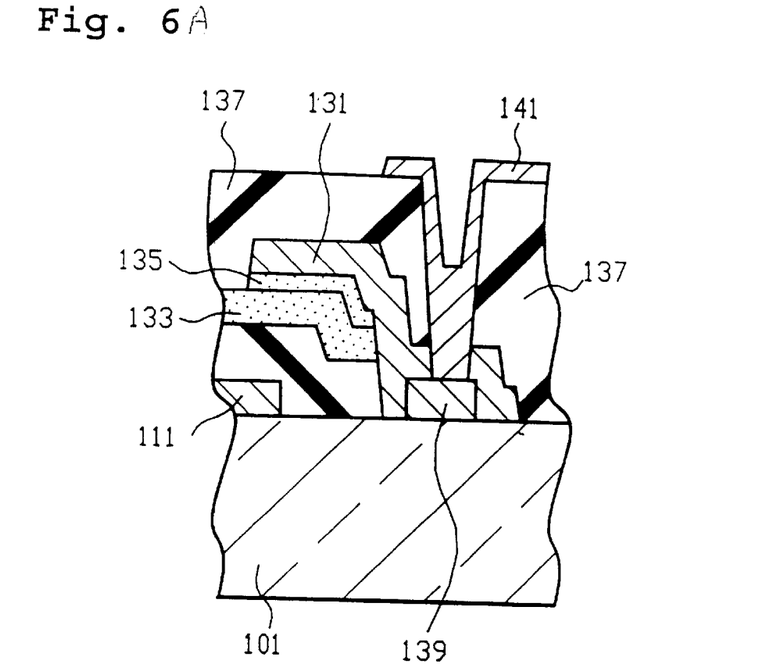
FIG. 6A is a cross-sectional view showing a structure of a contact between a drain electrode and a pixel electrode of the present invention.
Figure 6B:
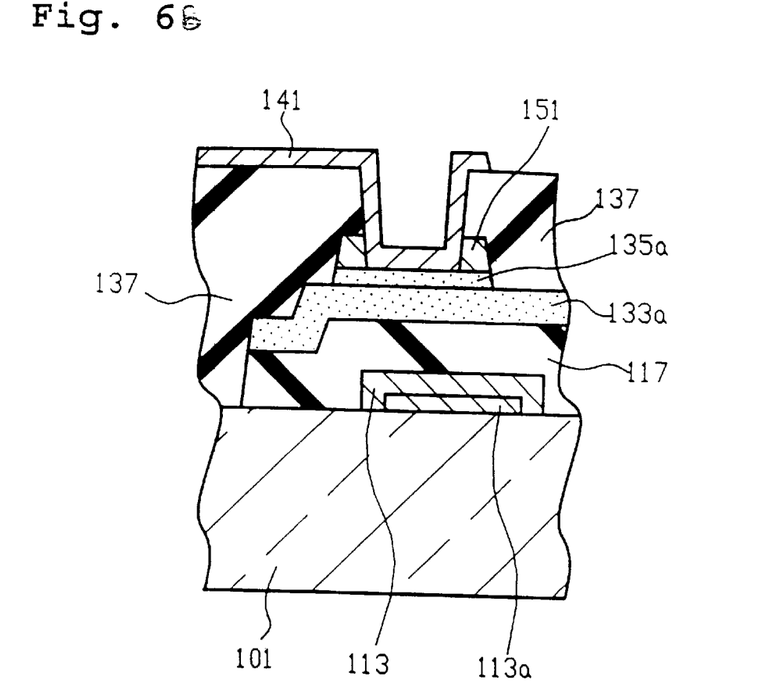
FIG. 6B is a cross-sectional view showing a structure of a contact between a storage capacitor electrode and the pixel electrode of the present invention.

As shown in FIG. 6A, the surface of the drain electrode 131 is removed. The surface of the dummy drain electrode 139 and the etched sides of the drain electrode 131 are in contact with the pixel electrode 141. Therefore, contact area is maintained as originally designed, and contact resistance remains low.

The present invention solves a problem resulting from a reduction in contact area between the drain electrode 131 and the pixel electrode 141 by removing the exposed portion of the drain electrode 131 when the drain contact hole 171 is formed, by patterning an organic material such as BCB. In the present invention, the dummy drain electrode 139 is added to the drain electrode 131 so that the contact area between the pixel electrode 141 and the drain electrode 131 is maintained as originally designed through contact with the surface of the dummy drain electrode 139, even if the exposed portion of the drain electrode 131 is removed. Therefore, contact resistance between the drain electrode 131 and the pixel electrode 141 remains low, and the LCD avoids having a horizontal dark stripe resulting from high contact resistance.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for manufacturing a liquid crystal display device, comprising the steps of:

forming a dummy drain electrode on a substrate;

depositing an insulation material on the dummy drain electrode;

forming a gate insulation layer by patterning the insulation material to expose the dummy drain electrode; and forming a drain electrode in contact with the dummy drain electrode and in contact with the substrate at sides of the dummy drain electrode.

2. The method for manufacturing a liquid crystal display device of claim 1, further including the steps of:

forming a passivation layer covering the substrate;

forming a drain contact hole to expose the drain electrode and the dummy drain electrode; and forming a pixel electrode on the passivation layer in contact with the drain electrode and the dummy drain electrode through the drain contact hole, wherein the step of forming the dummy drain electrode includes forming a gate, wherein the step of forming the gate insulation layer covers a gate line, and wherein the step of forming the drain electrode includes forming a source electrode to face the drain electrode.

3. The method for manufacturing a liquid crystal display device of claim 2, wherein the step of forming the gate line includes forming a first metal layer and a second metal layer.

4. The method for manufacturing a liquid crystal display device of claim 3, wherein in the step of forming the first metal layer includes forming an aluminum layer.

5. The method for manufacturing a liquid crystal display device of claim 3, wherein the step of forming the second metal layer includes forming a layer from a material selected from a group consisting of molybdenum, tantalum, chromium, and antimony.

6. The method for manufacturing a liquid crystal display device of claim 2, wherein the step of forming the passivation layer includes forming a benzo-cyclo-butene layer.

7. The method for manufacturing a liquid crystal display device of claim 2, further including the step of forming a semiconductor layer on the gate insulation layer, wherein the step of forming the gate line includes forming a gate electrode connecting to the gate line, wherein in the step of forming the gate insulation layer the gate insulation layer covers the gate electrode, wherein the step of forming the source electrode includes forming a source line connecting to the source electrode and a storage capacitor electrode overlapping a portion of the gate line, wherein the step of forming the drain contact hole includes forming a storage capacitor contact hole exposing the storage capacitor electrode, and wherein the step of forming the pixel electrode includes forming the pixel electrode in contact with the storage capacitor electrode through the storage capacitor contact hole.

8. The method for manufacturing a liquid crystal display device of claim 1, wherein the step of forming the dummy drain electrode includes forming the dummy drain electrode from a material selected from a group consisting of molybdenum, tantalum, chromium, and antimony.

9. A liquid crystal display device, comprising:

a substrate;

a dummy drain electrode on the substrate;

a drain electrode covering the dummy drain electrode and in contact with the substrate at sides of the dummy drain electrode;

a passivation layer covering the drain electrode;

a drain contact hole exposing the drain electrode and the dummy drain electrode; and a pixel electrode in contact with the drain electrode and the dummy drain electrode through the drain contact hole.

10. The liquid crystal display device of claim 9, further including:

a gate line on the substrate;

a gate insulation layer covering the gate line;

a source electrode facing the drain electrode; and a source line connected to the source electrode.

11. The liquid crystal display device of claim 9, wherein the passivation layer includes benzo-cyclo-butene.

12. The liquid crystal display device of claim 9, wherein the dummy drain electrode includes a material selected from a group consisting of molybdenum, tantalum, chromium, and antimony.

13. The liquid crystal display device according to claim 10, further including:

a gate electrode extending from the gate line; and a semiconductor layer on the gate insulation layer covering the gate electrode, wherein the gate insulation layer covers the gate electrode, the source electrode is in contact with a first portion of the semiconductor layer, and the drain electrode is in contact with a second portion of the semiconductor layer.

14. The liquid crystal display device of claim 10, wherein the gate line includes a first metal layer and a second metal layer.

15. The liquid crystal display device of claim 14, wherein the first metal layer includes aluminum.

16. The liquid crystal display device of claim 14, wherein the second metal layer is selected from a group consisting of molybdenum, tantalum, chromium, and antimony.

17. A liquid crystal display device, comprising:

a substrate;

a gate electrode and a dummy electrode formed on the substrate;

a gate insulation layer formed over the gate electrode;

a transistor semiconductor layer formed over the gate insulation layer;

a source electrode and a drain electrode formed over the gate insulation layer and over the transistor semiconductor layer, wherein the drain electrode is in contact with the dummy electrode and in contact with the substrate at sides of the dummy drain electrode;

a passivation layer formed over the substrate, the source electrode, and the drain electrode; and a pixel electrode formed over the passivation layer and in contact with the dummy electrode.

18. The liquid crystal display device of claim 17, further including a gate line formed on the substrate, wherein a portion of the gate insulation layer covers the gate line.

19. The liquid crystal display device of claim 18, further including a capacitor semiconductor layer over the gate line and the portion of the gate insulation layer.

20. The liquid crystal display device of claim 19, further including a storage capacitor electrode over the gate line, the portion of the gate insulation layer, and the capacitor semiconductor layer.

21. The liquid crystal display device of claim 20, wherein the pixel electrode is in contact with the storage capacitor electrode.

22. The liquid crystal display device of claim 20, wherein the pixel electrode is in contact with the drain electrode and the dummy electrode through a drain contact hole in the passivation layer.

23. The liquid crystal display device of claim 20, wherein the pixel electrode is in contact with the storage capacitor electrode through a storage capacitor contact hole in the passivation layer.

24. A method manufacturing a liquid crystal display device, comprising the steps of:

forming a gate electrode and a dummy electrode on a substrate;

forming a gate insulation layer over the gate electrode;

forming a transistor semiconductor layer over the gate insulation layer;

forming a source electrode and a drain electrode over the gate insulation layer and the transistor semiconductor layer, wherein the drain electrode is in contract with the dummy electrode and in contract with the substrate at sides of the gate electrode;

forming a passivation layer over the substrate, the source electrode and the drain electrode; and forming a pixel electrode over the passivation layer and in contract with the dummy electrode.

25. The method of claim 24, wherein the step of forming the gate electrode and the dummy electrode on the substrate and the step of forming a gate insulation layer include-forming a gate line on the substrate, wherein a portion of the gate insulation layer covers the gate line.

26. The method of claim 25, wherein the step of forming the transistor semiconductor layer over the gate insulation layer includes forming a capacitor semiconductor layer over the portion of the gate insulation layer.

27. The method of claim 26, wherein the step of forming the source electrode and the drain electrode over the gate insulation layer and the transistor semiconductor layer includes forming a storage capacitor electrode over the capacitor semiconductor layer, the gate line, and the portion of the gate insulation layer.

28. The method of claim 27, wherein the step of forming the pixel electrode over the passivation layer and in contact with the dummy electrode includes forming the pixel electrode in contact with the storage capacitor electrode.

29. The method of claim 27, wherein the step of forming the pixel electrode over the passivation layer and in contact with the dummy electrode includes forming a drain contact hole in the passivation layer and a storage capacitor contact hole in the passivation layer.

* * * * *